E. E. GAMACHE.
CAR FENDER.
APPLICATION FILED JULY 8, 1912.
1,094,387.
Patented Apr. 21, 1914.
2 SHEETS—SHEET 2.
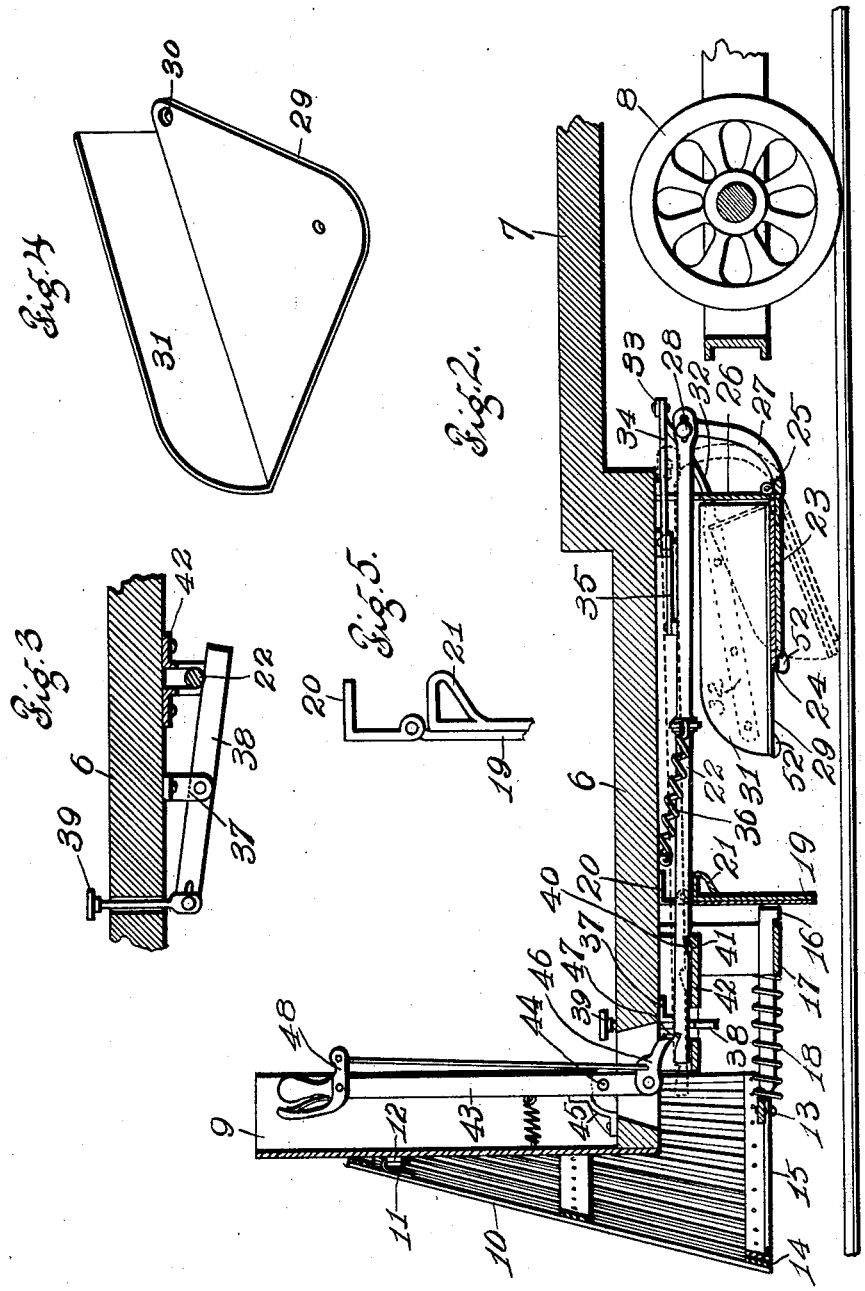
Witnesses
W. C. Stein
M. C. Lindsay.
Inventor
Edward E. Gamache
by Alfred A. Ticks Atty.

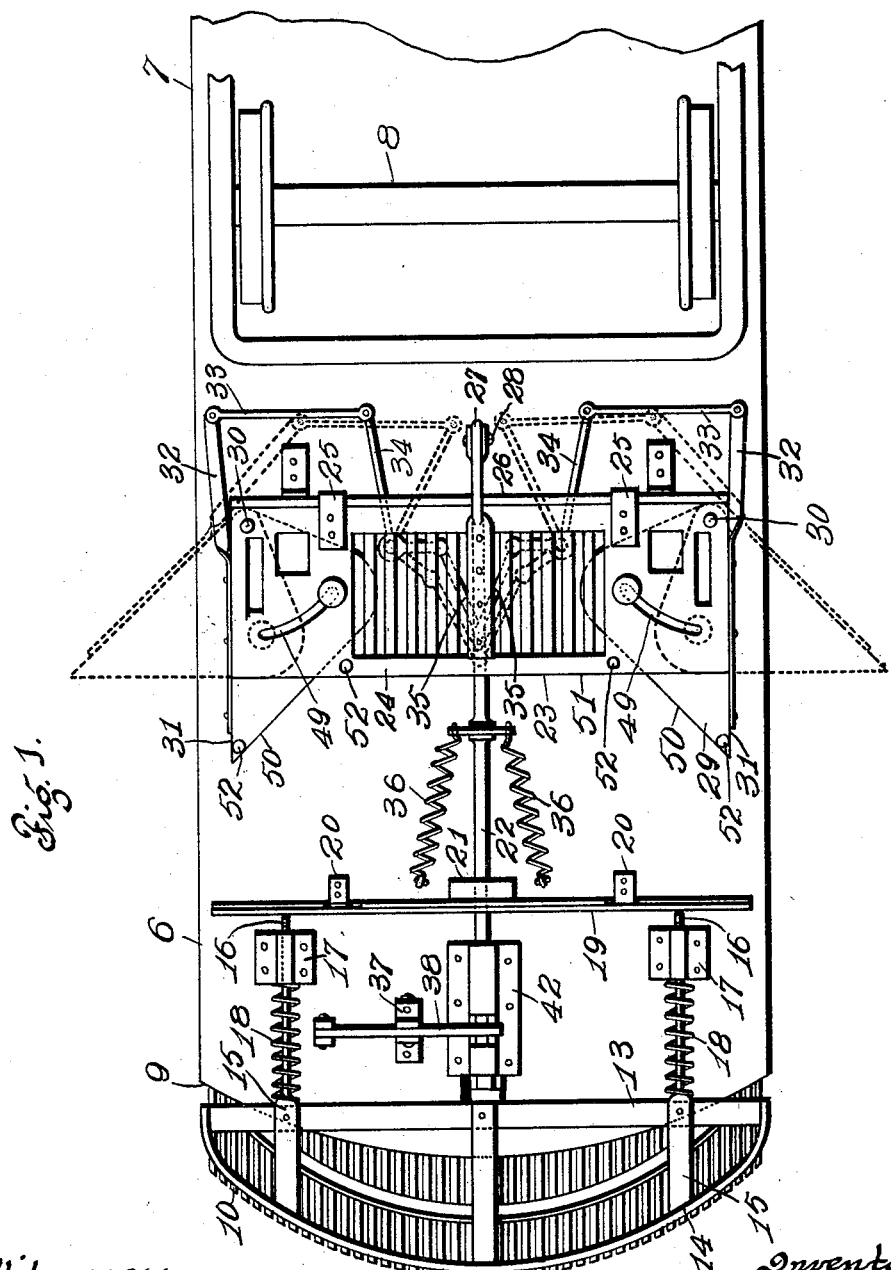

UNITED STATES PATENT OFFICE.

EDWARD E. GAMACHE, OF ST. LOUIS, MISSOURI, ASSIGNOR OF ONE-FIFTH TO JOSEPH K. ROY AND ONE-FIFTH TO WILLIAM McNAMEE, BOTH OF ST. LOUIS, MISSOURI.

CAR-FENDER.

1,094,387.　　　　Specification of Letters Patent.　　Patented Apr. 21, 1914.

Application filed July 8, 1912. Serial No. 708,323.

*To all whom it may concern:*

Be it known that I, EDWARD E. GAMACHE, a citizen of the United States, and resident of St. Louis, Missouri, have invented certain new and useful Improvements in Car-Fenders, of which the following is a specification.

This invention relates to improvements in car fenders and has for its object a scoop member located in advance of the truck, a mechanism by which the same is tripped by contact with the front fender or suspension frame and a means for placing the scoop in a normal position.

A further object of my invention is to construct a fender which will operate when an object contacts therewith, the sides of the scoop portion automatically projecting beyond the track so as to prevent the object from contacting with the wheels of the truck, and a lever mechanism by which the fender is placed in its normal closed position after the same has been tripped.

A further object is to construct a fender with a guard attached to the end of the car body, a scoop member located beneath the body and in advance of the truck, the sides of said scoop member projecting outwardly at a width greater than the truck or car body, the same to be tripped when contacting with an object and a lever mechanism by which the fender is raised to its normal position.

Figure 1 is a bottom plan view of a portion of a car body showing my invention in position thereon. Fig. 2 is a vertical central sectional view of the same. Fig. 3 is a detail sectional view of a portion of the platform showing the mechanism by which the fender can be operated by the manipulation of the foot. Fig. 4 is a detail perspective view of one of the wings carried by the scoop portion of the fender. Fig. 5 is a detail sectional view of the hinge mechanism by which the suspension frame is supported.

Referring to the drawings in detail, 6 indicates an ordinary car platform, 7 the body thereof and 8 the truck. On the dash 9 of the car platform is suspended the guard 10 which is constructed of strips of material and is held in position by means of the hooks 11 supported in the sockets 12; this guard is so arranged as to be readily removable from its position and is of such resilient material as to give sufficiently when brought in contact with an object. The lower end of the guard is provided with a cross bar 13 and to which and the bottom forward end 14 are attached bars 15, their free ends formed in the shape of hooks 16, which have bearings in suspension brackets 17 suspended from the bottom of the car platform. On the bars 15 and located between the cross bar 13 and the brackets 17 are springs 18, the normal tension of which is to keep the hook 16 in contact with the suspension brackets and said springs in addition return the guard to its normal position after having been slightly depressed by contact with an object.

Slightly in advance of the hook 16 is a suspension frame 19; this frame is of the entire width of the platform and is hingedly suspended to the brackets 20 attached to the under side of the platform, the central portion of the suspension frame being provided with a projection 21 which is arranged and designed to come in contact with a trip bar 22 located beneath the platform and controlling the movement of the scoop member 23.

The scoop member 23 consists of a main portion 24 made preferably of a skeleton nature and is hinged at the point indicated by the numeral 25 to a rigid back 26; this back is firmly attached to the under side of the platform, and to the under side and approximately central of the main portion is a lever 27, this lever being bent upwardly as shown and pivoted at the point indicated by the numeral 28 to the trip bar 22 (see Fig. 2). On each end of the main portion is pivotally mounted a wing 29; these wings are pivoted to the main portion at the points indicated by the numeral 30 and to the upturned side portions 31 on each wing is rigidly attached a lever 32; the free ends of these levers are connected to connecting rods 33 which in turn are connected to bell crank levers 34 which are pivoted to the under side of the platform, and to the short arms of the bell crank levers are connected links 35, the opposite ends of which are attached to the trip bar 22.

The trip bar 22 is controlled by springs 36, which springs have a tendency to operate the scoop member simultaneously with the wings whenever an object contacts with the guard or suspension frame. The extended position of the scoop member when the same has been tripped is clearly shown by dotted lines in Figs. 1 and 2.

Beneath the platform and supported in hangers 37 is a foot lever 38, the same being provided with a pedal 39 with which the foot is brought in contact, the opposite end of the lever communicating with the under side of the trip bar, its tendency being to raise the trip bar and thus release the notch 40 from the tooth 41 formed on the hanger guard 42 which is secured to the underside of the platform.

On the platform and in close proximity to the dash is a hand lever 43 which is pivoted at the point 44 to a bracket 45, the bottom end having a pawl 46 which is capable of being brought in contact with the notch 47 formed in the trip bar, whenever it is desired to raise the scoop member to its normal position, and this pawl is controlled by the grip lever 48.

The wings in their outward movement are guided in the curved slots 49 formed in the main portion of the scoop member and the movement is limited so as to bring the edges 50 in alinement with the edge 51 of the main portion. The bottom contacting edge of the main portion and the wings are provided at intervals with rounded shoes 52 which permit the scoop together with the wings to freely ride over irregular surfaces on the track or road bed.

The operation of my invention is as follows: The guard is suspended in position on the dash and the rods 15 inserted into the hanger 17. The hand lever 43 is manipulated to elevate the scoop member to a raised position as shown by solid lines in Fig. 2. In the event that an object contacts with the guard, the hooked ends of the rods 15 will contact with the suspension frame, tilting the same rearwardly, which automatically releases the trip bar from the tooth 41 by means of the projection 21 of the suspension frame contacting therewith; immediately after the notch has been released from the tooth the springs 36 pull upon the trip bar, which throws the scoop member downwardly, as shown by dotted lines in Fig. 2 simultaneously operating the bell crank levers and the connecting rods and throwing the wings outwardly, as shown by dotted lines in Fig. 1. After the mechanism has been tripped the operator of the car can raise the same back to its normal position by means of the hand lever 43. The mechanism can also be tripped by the operator placing his foot upon the pedal 39, which will release the trip bar from its locked position, throwing the scoop member downwardly, as previously described. Should an object pass beneath the guard without operating the mechanism, the scoop member will be manipulated by means of the object contacting with the suspension frame; in this manner it will be an absolute impossibility for an object coming in contact with the wheels of the truck, and should the object be in such a position as to be located near the side of the car, the projecting wings will guard the object from coming in contact with the truck.

Having fully described my invention what I claim is:

1. A car fender comprising a guard, rods carried thereby, a suspension frame hingedly suspended beneath the platform and against which said rods are adapted to contact, a scoop member suspended beneath the car body and in advance of the truck, a trip bar controlling the same and adapted to be operated by the said suspension frame, wings pivotally mounted on the scoop member, a lever mechanism for operating the wings and projecting the same outwardly automatically with the downward movement of the scoop member, the said trip bar being releasable from its locked position either by the foot or by contact with an object and a lever for placing the scoop member and the wings back in their normal positions.

2. A car fender comprising a detachable guard suspended from the dash of the car, a suspension frame located beneath the platform and hingedly mounted, a scoop member suspended beneath the car body and hingedly mounted, a trip bar controlling the movement of the scoop member and releasable by the movement of the suspension frame, wings carried by the scoop member, a lever mechanism operated by the trip bar for automatically projecting the wings outwardly with the downward movement of the scoop member, a foot operating lever by which the trip bar may be released and a hand lever for raising the scoop member to its normal position for locking the trip bar, substantially as specified.

In testimony whereof, I have signed my name to this specification, in presence of two subscribing witnesses.

EDWARD E. GAMACHE.

Witnesses:
Wm. McNamee,
Alfred A. Eicks.